(12) United States Patent
Bar-On

(10) Patent No.: US 7,031,470 B1
(45) Date of Patent: Apr. 18, 2006

(54) PROTECTION OF DATA ON MEDIA RECORDING DISKS

(75) Inventor: Gershon Bar-On, Kochav Hashachar (IL)

(73) Assignee: NDS Limited, West Drayton (GB)

( * ) Notice: Subject to any disclaimer, the term of this patent is extended or adjusted under 35 U.S.C. 154(b) by 0 days.

(21) Appl. No.: 09/376,384

(22) Filed: Aug. 16, 1999

Related U.S. Application Data

(63) Continuation of application No. PCT/IL99/00007, filed on Jan. 5, 1999.

(30) Foreign Application Priority Data

Jan. 22, 1998 (IL) ................................. 123028

(51) Int. Cl.
H04N 7/167 (2006.01)
H04L 9/00 (2006.01)

(52) U.S. Cl. .................................. 380/203; 713/169

(58) Field of Classification Search ................ 713/193; 705/57; 380/201, 203; 360/60
See application file for complete search history.

(56) References Cited

U.S. PATENT DOCUMENTS

| | | | | |
|---|---|---|---|---|
| 4,865,321 | A | * | 9/1989 | Nakagawa et al. ............ 463/29 |
| 4,931,789 | A | | 6/1990 | Pinnow .................. 340/825.56 |
| 5,070,479 | A | | 12/1991 | Nakagawa .................. 395/575 |
| 5,119,353 | A | | 6/1992 | Asakura ....................... 369/13 |
| 5,144,649 | A | | 9/1992 | Zicker et al. .................. 379/59 |
| 5,267,311 | A | | 11/1993 | Bakhoum ....................... 380/4 |
| 5,416,840 | A | | 5/1995 | Cane et al. ..................... 380/4 |
| 5,445,532 | A | * | 8/1995 | Evans .......................... 439/161 |
| 5,513,260 | A | | 4/1996 | Ryan .............................. 380/3 |
| 5,528,222 | A | | 6/1996 | Moskowitz et al. ......... 340/572 |
| 5,532,920 | A | | 7/1996 | Hartrick et al. ............ 364/419.1 |
| 5,533,123 | A | | 7/1996 | Force et al. .................... 380/4 |
| 5,539,388 | A | | 7/1996 | Modgil .................. 340/825.17 |
| 5,550,358 | A | | 8/1996 | Tait et al. ..................... 235/380 |
| 5,561,420 | A | | 10/1996 | Kleefeldt et al. ....... 340/825.31 |
| 5,592,555 | A | | 1/1997 | Stewart ....................... 380/49 |
| 5,616,966 | A | | 4/1997 | Fischer et al. ............. 307/10.5 |
| 5,640,002 | A | | 6/1997 | Ruppert et al. ............. 235/472 |
| 5,651,064 | A | | 7/1997 | Newell .......................... 380/4 |
| 5,652,838 | A | | 7/1997 | Lovett et al. ............... 395/186 |
| 5,659,613 | A | | 8/1997 | Copeland et al. ............. 380/3 |
| 5,661,799 | A | | 8/1997 | Nagel et al. ................... 380/4 |

(Continued)

FOREIGN PATENT DOCUMENTS

DE 4403206 A1 8/1995

(Continued)

OTHER PUBLICATIONS

Olukotun, Nayfeh, Hammond, Wilson, and Chang, The Case for a Single-Chip Multiprocessor, Proceedings Seventh International Symp. Architectural Support for Programming Languages and Operating Systems, Oct. 1996.*

(Continued)

*Primary Examiner*—Ayaz Sheikh
*Assistant Examiner*—Brandon Hoffman
(74) *Attorney, Agent, or Firm*—Ladas and Parry LLP

(57) ABSTRACT

This invention discloses a secure recording medium having at least one of audio, video and software content, comprising a plurality of media recording disks (DVD's) with a disk security chip embedded in each the DVD, each the disk chip comprising a security key, wherein at least two of the DVD's have different disk security keys.

A method for protecting access to content recorded on a media recording disk (DVD) is also disclosed.

14 Claims, 4 Drawing Sheets

U.S. PATENT DOCUMENTS

| | | | | |
|---|---|---|---|---|
| 5,881,152 | A | * | 3/1999 | Moos .......................... 713/193 |
| 5,988,500 | A | * | 11/1999 | Litman ....................... 235/450 |
| 6,005,940 | A | | 12/1999 | Kulinets ...................... 380/21 |
| 6,240,513 | B1 | * | 5/2001 | Friedman et al. ........... 713/152 |

FOREIGN PATENT DOCUMENTS

| | | |
|---|---|---|
| DE | 19616819 A1 | 10/1997 |
| EP | 0774706 A1 | 5/1997 |
| EP | 0809245 A2 | 11/1997 |
| EP | 0849734 A2 | 6/1998 |
| EP | 0849734 A3 | 3/1999 |
| WO | 96/29699 | 9/1996 |
| WO | 97/26564 | 7/1997 |
| WO | 97/41562 | 11/1997 |
| WO | 98/04966 | 2/1998 |
| WO | 98/52191 | 11/1998 |

OTHER PUBLICATIONS

Anderson, Kuhn, Tamper Resistance-A Cautionary Note The Second USENIX Workshop on Electronic Commerce Proceedings Nov. 1996.*

Menezes, Handbook of Applied Crytography, CRC Press 1997, pp. 406-410.*

Taylor, J., "DVD Demystified" *McGraw-Hill* (2000) Second Edition, pp. 192-193.

* cited by examiner

PROTECTION OF DATA ON MEDIA RECORDING DISKS

This application is a continuation of PCT/IL99/00007 filed Jan. 5, 1999.

FIELD OF THE INVENTION

The present invention relates generally to securing transfer of information between a media recording disk and a media recording disk player by means of an electronic security chip attached to the media recording disk, the chip communicating with the disk player via encrypted communication.

BACKGROUND OF THE INVENTION

The problem of protecting creative works stored on data recording media, such as movies or other home entertainment video programs which are distributed to a large number of users, is very well known. Preventing copying works recorded in digital format is particularly challenging and troublesome because digitally recorded works can be easily copied with virtually no degradation in quality. Indeed when the first DVD systems were sold, the content providers were reluctant to make full use of the new technology for fear of easy, degradation-free copying. The problem is becoming more acute since the quality of optical media is improving from CIF (in conventional CD's with MPEG-1) to MPEG-2 MP@ML (in current DVD) to HDTV (in future optical memory devices). This problem will be even greater when re-writable DVD-RAM becomes available.

The DVD industry has proposed a minimal security system in which the creative work is encrypted and decryption keys are stored in a dedicated location on the disk. During reading, the keys are read and used to decrypt a data stream, but the decrypted stream is not made available to the user in its compressed format. The result is that the user cannot write a clear data stream into a writable disk unless the data stream is compressed again which reduces image quality. However, there are doubts about the efficiency of this approach. The main limitation is that this method does not provide any way of dynamically allocating rights to the creation, thereby making it impossible to have time-limited renting. Another drawback is that the success of this method depends on the secrecy of the DVD encryption which cannot be expected to be kept secret a very long time. Another limitation is that this method does not differentiate between the rights of disk owners.

In another approach, called the Divx™ system, the DVD player has full responsibility for managing the viewer's rights. The player calls a central Divx™ computer via a phone line to get new rights, or to report on the disk use. The encryption used is proprietary.

The main disadvantage of both of the above methods is that security can be breached once the encryption algorithm is known merely by reading the disk content.

Attempts have been made in the art to provide a more secure media recording disk. PCT patent application WO 97/41562, published Nov. 6, 1997, the disclosure of which is incorporated herein by reference, describes a CD with a built-in chip. The CD has a layer for data storage in which is embedded a chip and CD coupling element for contact-free transmission of data between the chip and a data processing device. The CD coupling element may be a coil, dipole antenna, an electrostatic coupling surface or an optical coupling element. The chip can be a processor chip on which algorithms can be run or security structures can be realized in order to protect software or prevent access to data on the CD. In one example described in the WO 97/41562 patent application, an inquiry can be made from the CD player via the CD coupling element to the chip regarding a password which is required to run a program or to retrieve privileged information. The inquiry can be concerned with a key or algorithm required to decode a program code.

Although the system of the WO 97/41562 patent application contemplates protecting creative works stored on CD's by providing the chip embedded in the CD with security algorithms, no enabling description, however, is provided regarding the exact nature of how such security algorithms actually work. Moreover, the problem of security being breached by listening to the communication between the chip on the disk and the player is not addressed at all in the WO 97/41562 patent application.

An earlier German patent document 4403206 describes a CD with an integrated smart chip on its outer surface. The chip contains encoding data for accessing data on the disk. Again the problem of security being breached by listening to the communication between disk and player is not addressed in this document.

Encryption technology is a well known method for restricting the ability to make illegal copies of software or programs stored on recording media and for securing authorization of use of software, such as from an authorized distributor. Two relevant examples of such implementation of encryption technology are U.S. Pat. No. 4,658,093 to Hellman and U.S. Pat. No. 5,416,840 to Cane et al., the disclosures of which are incorporated herein by reference.

Hellman describes a system for secure distribution of software between a base unit which uses the software and a remote authorization unit which authorizes use of the software in the base unit. Compressive, one-way cryptological functions, known as hash functions, are used to secure communication between the base unit and the remote authorization unit, the communication being non-real time by telephone line, mail or the like. The base unit communicates requests to the authorization unit. The authorization unit processes the request and generates a key which is recognized in the base unit, thereby allowing use of the software. Cane et al. also requires generating an authorization key in a remote authorization center. However, the use of non-real time communication with a remotely-located authorization center is not practical for the problem of securing use of home-distributed CD's used with CD players and for preventing any security breach between the CD and the CD player.

Thus, the encryption techniques of the prior art, even when combined with using a chip on the disk, are not sufficient to solve the problem of security breaches by listening to the communication between disk and player.

SUMMARY OF THE INVENTION

The present invention seeks to provide an improved method of securing transfer of information between a media recording disk and a media recording disk player by means of an electronic security chip attached to the media recording disk. The disk chip is responsible for managing access to the disk's content. A corresponding chip is installed in the disk player that manages the use of the data stream, according to the legitimate rights of the user. The present invention uses novel encrypted communication between the chip and the disk player so as to provide a level of security that substantially cannot be breached by listening to the communication between disk and player.

The content on the disk is encrypted with a known algorithm, with a key stored in encrypted entitlement control messages (ECM's) in the disk data stream. The on-disk security chip is similar to a contactless smart card chip (similar to that defined in ISO 14443). It is embedded in the plastic in such a way that it does not compromise the mechanical balance of the disk. It is programmed and personalized so that each disk has a different security chip.

The on-disk security chip performs an authentication process with the player chip, making sure that the creation is performed in a legitimate player. After this authentication is successful, the on-disk security chip checks disk-specific authorizations, such as if the viewer allowed to see portions of the disk, which portions, how many times, for how long, etc.

The on-disk security chip then agrees to deliver keys that are used to decrypt the ECM's, in the player security chip. The player then decrypts the regular data stream. The player is built such that the decrypted, compressed data stream is strictly internal, and cannot be probed. This prevents writing clear, still compressed data stream on another disk (of whatever type, magnetic, optical, etc.). After decompression, the need for re-compression will decrease the quality of signal, thereby not posing any security problem.

It is noted that throughout the specification and claims the terms media recording disk, optical disk, DVD and CD are used interchangeably for the sake of convenience. However, it is emphasized that the present invention is not limited to optical disks. Rather the present invention can be equally carried out with any kind of media recording disk, optical or non-optical, even floppy (5.25 inch) or stiffy (3.5 inch) disks, as will be appreciated by those skilled in the art.

There is thus provided in accordance with a preferred embodiment of the present invention a secure recording medium having at least one of audio, video and software content, including a plurality of media recording disks (DVD's) with a disk security chip embedded in each the DVD, each the disk chip including a security key, wherein at least two of the DVD's have different disk security keys.

In accordance with a preferred embodiment of the present invention the at least two of the DVD's have common content recorded therein.

Further in accordance with a preferred embodiment of the present invention the medium has audio content and video content and the security key is different for audio content than for video content.

Additionally in accordance with a preferred embodiment of the present invention a first antenna is disposed in the DVD which is in electrical communication with the disk security chip.

Still further in accordance with a preferred embodiment of the present invention the DVD is substantially statically balanced. Preferably the DVD is substantially dynamically balanced.

In accordance with a preferred embodiment of the present invention there is also provided a DVD player, the player including a second antenna which is in wireless communication with the first antenna.

Additionally in accordance with a preferred embodiment of the present invention there is provided a player security chip which is in electrical communication with the second antenna.

Further in accordance with a preferred embodiment of the present invention the player security chip decrypts data received from the disk security chip.

Still further in accordance with a preferred embodiment of the present invention the player security chip is integrated into a circuit of an integrated receiver decoder of the DVD player.

In accordance with a preferred embodiment of the present invention the player security chip is detachable from the DVD player. Preferably the player security chip is generally tamper-resistant, clone-resistant and upgradable. Preferably the player security chip is backwardly compatible with a previous version of at least one of the player security chip and the disk security chip.

Additionally in accordance with a preferred embodiment of the present invention the player security chip performs an authentication process with the disk security chip.

Further in accordance with a preferred embodiment of the present invention the player security chip verifies legitimacy of the disk security chip by means of a function of a geometric property of the DVD.

Still further in accordance with a preferred embodiment of the present invention the function is selected from the group consisting of a function of an angle between layers of the DVD, a diameter of the DVD, a thickness of the DVD and an eccentricity of the DVD.

In accordance with a preferred embodiment of the present invention the disk security chip performs an authentication process with the player security chip.

Additionally in accordance with a preferred embodiment of the present invention the authentication process includes a mutual zero-knowledge interaction authentication process.

There is also provided in accordance with a preferred embodiment of the present invention a secure recording medium including a media recording disk (DVD) with a disk security chip embedded therein, characterized by the DVD being substantially statically balanced. Preferably the DVD is substantially dynamically balanced.

There is also provided in accordance with a preferred embodiment of the present invention a secure recording medium including a media recording disk (DVD) with a disk security chip embedded therein, a first antenna disposed in the DVD which is in electrical communication with the disk security chip, and a DVD player, the player including a second antenna which is in wireless communication with the first antenna, characterized in that the secure recording medium further includes a player security chip in electrical communication with the second antenna. Preferably the player security chip decrypts data received from the disk security chip.

There is also provided in accordance with a preferred embodiment of the present invention a secure recording medium including a media recording disk (DVD) with a disk security chip embedded therein, a first antenna disposed in the DVD which is in electrical communication with the disk security chip, a DVD player, the player including a second antenna which is in wireless communication with the first antenna, and a player security chip in electrical communication with the second antenna, characterized by the player security chip verifying legitimacy of the disk security chip by means of a function of a geometric property of the DVD.

There is also provided in accordance with a preferred embodiment of the present invention a secure recording medium including a media recording disk (DVD) with a disk security chip embedded therein, a first antenna disposed in the DVD which is in electrical communication with the disk security chip, a DVD player, the player including a second antenna which is in wireless communication with the first antenna, and a player security chip in electrical communication with the second antenna, characterized by an authentication process being performed between the player security chip and the disk security chip.

There is also provided in accordance with a preferred embodiment of the present invention a method for protecting access to content recorded on a media recording disk (DVD), including providing a disk security chip on the DVD, the disk security chip managing access to the content of the DVD, providing a corresponding player security chip in a DVD player which is operative to play the DVD, the player security chip managing use of a data stream received from the DVD, the disk security chip being in wireless communication with the player security chip, and providing the disk security chip with a disk key not known to a disk manufacturer.

There is also provided a method for protecting access to content recorded on a media recording disk (DVD), including providing a disk security chip on the DVD, the disk security chip managing access to the content of the DVD, providing a corresponding player security chip in a DVD player which is operative to play the DVD, the player security chip managing use of a data stream received from the DVD, the disk security chip being in wireless communication with the player security chip, and providing a player key common to a plurality of the DVD players during a predetermined period of time.

In accordance with a preferred embodiment of the present invention the method includes encrypting contents of the DVD with a content key.

Additionally in accordance with a preferred embodiment of the present invention the method includes performing an authentication process between the disk security chip and the player security chip. Preferably the authentication process includes a mutual zero-knowledge interaction authentication process.

Further in accordance with a preferred embodiment of the present invention the disk security chip, after assuring that the DVD player is authentic, sends the DVD player the disk key.

Still further in accordance with a preferred embodiment of the present invention the disk security chip, after assuring that the DVD player is authentic, sends the DVD player the disk key encrypted with the player key.

In accordance with a preferred embodiment of the present invention the player security chip verifies legitimacy of the disk key as a function of a geometric property of the DVD.

Additionally in accordance with a preferred embodiment of the present invention the DVD is a multi-layer DVD and the geometric property is an angle between layers of the DVD.

Further in accordance with a preferred embodiment of the present invention the method includes the player security chip sending a random number R to the disk security chip, the random number R being different each time the DVD is played, the disk security chip sending the player security chip an encrypted concatenation of a hash function of R, called h(R), and the content key, encrypted with the disk key, the player security chip decrypting the concatenation, and computing h(R) and comparing with the h(R) sent by the disk security chip, the player security chip verifying R to be correct, thereby certifying that the disk chip really knows the player key, the player security chip obtaining content key from the concatenation, and the player security chip using the content key to decrypt control words that are located within ECM's in the DVD.

There is also provided in accordance with a preferred embodiment of the present invention a method for protecting access to content recorded on a media recording disk (DVD), including providing a disk security chip on the DVD, the disk security chip managing access to the content of the DVD, providing a corresponding player security chip in a DVD player which is operative to play the DVD, the player security chip managing use of a data stream received from the DVD, the disk security chip being in wireless communication with the player security chip, and performing an authentication process between the disk security chip and the player security chip. Preferably the authentication process includes a mutual zero-knowledge interaction authentication process.

There is also provided in accordance with a preferred embodiment of the present invention a method for protecting access to content recorded on a media recording disk (DVD), including providing a disk security chip on the DVD, the disk security chip managing access to the content of the DVD, providing a corresponding player security chip in a DVD player which is operative to play the DVD, the player security chip managing use of a data stream received from the DVD, and communicating information from the player security chip to the disk security chip by illuminating selected tracks on the DVD that are covered with photosensitive materials, whereby the disk security chip monitors the illuminated tracks that are illuminated by the laser head.

Additionally in accordance with a preferred embodiment of the present invention the method includes communicating information from the disk security chip by covering the laser-head illumination tracks on the DVD with a voltage-controlled semi-opaque material, and then using the disk security chip to control opacity of the semi-opaque material by appropriately controlling a voltage threat, the degree of opacity being used to communicate the information from the disk security chip to the player security chip.

There is also provided in accordance with a preferred embodiment of the present invention a method for protecting access to content recorded on a media recording disk (DVD), including providing a DVD with content recorded thereon which is to be protected, providing a disk security chip on a media recording disk different from the DVD, the disk security chip managing access to the content of the DVD, and providing a corresponding player security chip in a DVD player which is operative to play the DVD, the player security chip managing use of a data stream received from the DVD, the disk security chip being in wireless communication with the player security chip.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
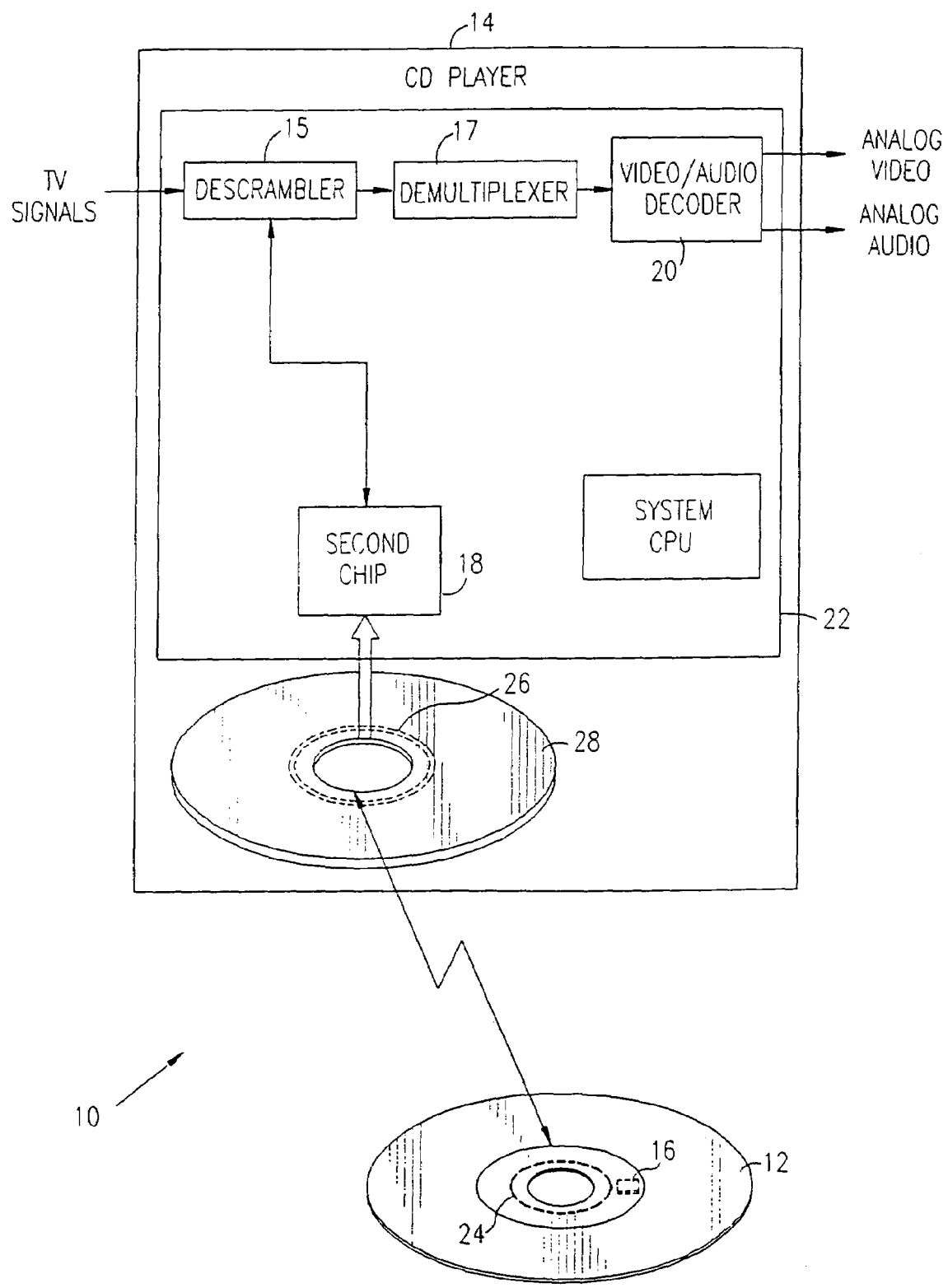
FIG. 1 is a simplified block diagram of a secure communications system between a DVD, with a chip embedded therein, and a DVD player, constructed and operative in accordance with a preferred embodiment of the present invention.

Reference is now made to FIG. 1 which illustrates a secure communications system 10 between a DVD 12 and a DVD player 14, constructed and operative in accordance with a preferred embodiment of the present invention. A disk chip 16 (i.e., silicon device or integrated circuit) is embedded in DVD 12, as will be described hereinbelow with reference to FIGS. 2 and 3. A player chip 18 is provided in DVD player 14.

Before elaborating on the provision of player chip 18 in DVD player 14, it is first helpful to understand a preferred implementation of the present invention, namely, subscriber television systems. (However, it should be emphasized that the present invention is certainly not limited merely to such television systems.) In subscriber satellite television systems, as is known in the art, digital video signals are typically encoded by means of digital video compression, such as in accordance with ISO 13818, commonly referred to in the art as the MPEG standard. The encrypted television signals are transmitted together with a conditional access stream which contains, inter alia, entitlement control messages (ECM's), decryption key information and the encoded digital video signals. Encrypted television signal systems are described, for example, in U.S. Pat. Nos. 5,282,249 and 5,481,609 to Cohen et al., the disclosures of which are incorporated herein by reference. An integrated receiver decoder (IRD) receives the encrypted signal and uses the decryption key information to decode the ECM's which determine whether the viewer is authorized to view the particular broadcast.

In a preferred embodiment of the present invention, particularly useful for such encrypted television signal systems, player chip 18 is integrated with an IRD 22, such as being integrated into the MPEG-2 decoder integrated chip. In a preferred construction, player chip 18 interfaces with a descrambler 15. Descrambler 15 descrambles the conditional access stream contained in the received television signals, and outputs the descrambled information via a demultiplexer 17 to a video/audio decoder 20 which outputs analog video and analog audio signals. Integrating player chip 18 into the MPEG-2 decoder integrated chip ensures that the scrambling keys and the clear data stream are not accessible from the outside because the decrypted, compressed data stream is strictly internal, and cannot be probed. This prevents writing clear, still compressed data stream on another disk (of whatever type, magnetic, optical, etc.). After decompression, the need for re-compression decreases the quality of signal.

Player chip 18 is most preferably easily removable or detachable from the circuit board, such as being mounted on a carrier plug which is soldered to the board. Chip 18 is preferably constructed to be as secure as possible so as to prevent reverse-engineering or cloning. Tamper-resistant or copy-resistant chip layout and packaging techniques, which are known in the art, should be used to construct chip 18. It is also desirable to make chip 18 upgradable so as to allow replacing chip 18 with an upgraded version at certain time intervals, all the time maintaining backward compatibility.

It is noted that although disk chip 16 contains a secret key as will be described hereinbelow, nevertheless the need for security is not as important as that of chip 18. This is because an attempted attack on chip 16 is aimed at only one creation. To prevent this kind of attack, it may be sufficient to use batches of disks that are scrambled using different keys. For example, a creation sold in 10,000 units, may be manufactured as 20 batches of 500 units each. Since each batch has its own keys, a breach in chip security will not help for disks that are manufactured in other batches, but only for clones. Of course, chip 16 may also be manufactured with tamper-resistant or copy-resistant chip layout and packaging techniques.

An antenna 24 is embedded in DVD 12, as will be described hereinbelow with reference to FIGS. 2 and 3. Antenna 24 is in wireless communication with a corresponding antenna 26 in DVD player 14. Antenna 26 is preferably disposed in a pressure disk 28 which makes up part of the clamping mechanism which clamps DVD 12 in DVD player 14. Such clamping mechanisms with pressure disks are well known in the art and need no further explanation. Antenna 26 may be attached to pressure disk 28 in any suitable manner, such as in accordance with the teachings of PCT patent application WO 97/41562. The exact attachment and placement of antenna 26 is not essential to the present invention, and antenna 26 may be packaged in any other suitable portion of DVD player 14, as long as it is in good wireless communication with antenna 24.

Figure 2:
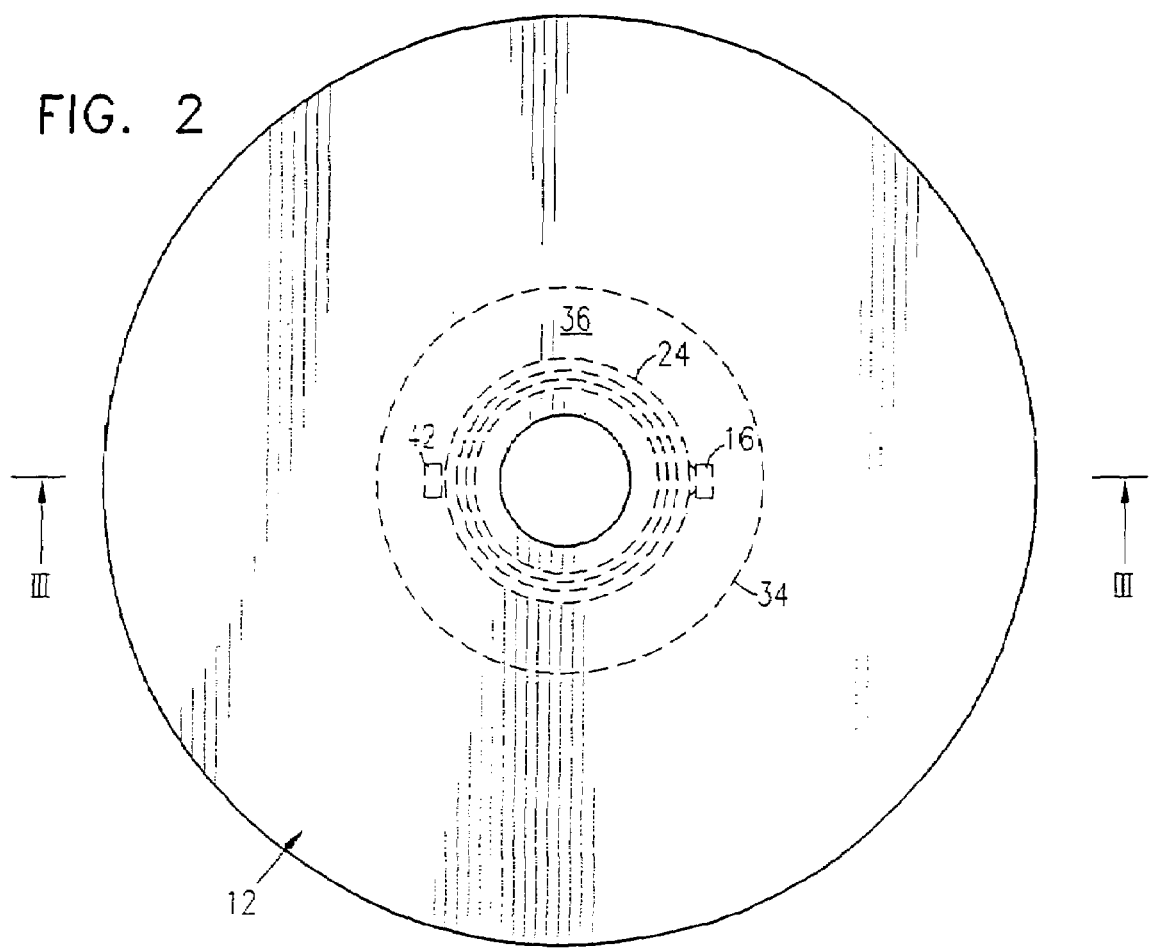
FIG. 2 is a simplified top view illustration of the DVD of FIG. 1 in accordance with a preferred embodiment of the present invention.
Figure 3:
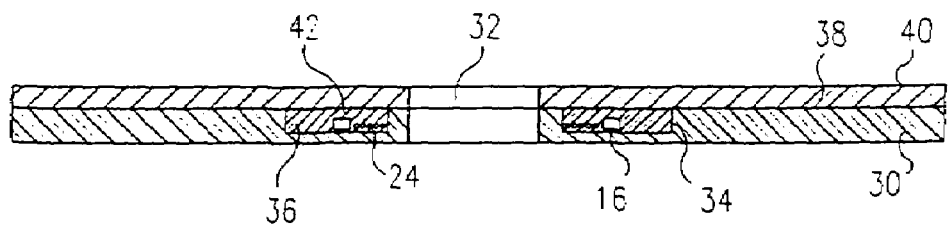
FIG. 3 is a simplified sectional illustration of the DVD of FIG. 1, taken along lines III—III in FIG. 2.

Reference is now made to FIGS. 2 and 3 which illustrate the structure of DVD 12 with chip 16 and antenna 24. DVD 12 includes an information-carrying layer 30 which is typically formed by injection-molding of a plastic. A central hole 32 is formed in DVD 12 and a recess 34 is formed in layer 30, either in the molding step or afterwards such as by milling. Chip 16 and antenna 24 are embedded in recess 34, such as by bonding or any other suitable means. Chip 16 and antenna 24 may be placed separately in recess 34, or most preferably, manufactured as a single module 36 which is embedded in recess 34. Recess 34 is located in an area of DVD 12 not used for data storage. Antenna 24 is preferably made of conductive wires that are printed on layer 30, with measures taken to prevent scratching of the layer. A metal layer 38 is preferably vaporized onto layer 30 and an overcoat of a protective material 40, such as paint, is applied over layer 38.

It is a particular feature of the present invention that chip 16, or the entire module 36 when packaged as such a module, is embedded in recess 34 such that the static balance of DVD 12 is maintained. This may be accomplished by proper selection of materials used to construct chip 16, antenna 24 and/or module 36, together with proper sizing of recess 34 to maintain static balance of the entire DVD 12. Alternatively, a counterweight 42 may be placed opposite to chip 16 to preserve static balance. Although not normally done for thin disks like DVD's, nevertheless it may be advantageous to place counterweight 42 (or configure chip 16, antenna 24, module 36 and recess 34) such that DVD 12 is also dynamically balanced. Techniques of achieving dynamic balance are well known in mechanical engineering. It should be noted that static or dynamic balancing is not taught or shown in PCT patent application WO 97/41562.

As taught in PCT patent application WO 97/41562, the concentricity of module 36 about central hole 32 should be accurate.

Antenna 24 is in electrical communication with chip 16 and antenna 26 is in electrical communication with chip 18, such as by wiring, vias or electrical contacts, thereby effecting close-range contactless radio communication between chips 16 and 18. Antennas 24 and 26 are typically formed as coils, although any type of antenna may be used as well. Antennas 24 and 26 have two purposes: first, to allow the passing of power supply from the player to disk chip 16, and second, to allow digital communication between disk chip 16 and player chip 18. High frequency, low power radio waves are preferably used for this purpose.

As an alternative to the radio communication described above, it is possible to optically provide contactless power supply and communication between disk chip 16 and player chip 18. As an example, power can be supplied by a light source which directs light to a photovoltaic cell. Communication to disk chip 16 can be achieved by illuminating selected tracks on disk 12 that are covered with photosensitive materials, whereby disk chip 16 monitors the tracks that are illuminated by the laser head. Communication from disk chip 16 can be accomplished by covering the laser-head illumination tracks on the disk with voltage-controlled semi-opaque materials, such as liquid crystals, located upon a reflective material. Disk chip 16 can then control the opacity of the semi-opaque material by appropriately controlling the voltage, the degree of opacity being used to communicate the desired information from disk chip 16 to player chip 18. It should be noted that this method does not require any modification of existing disk players, except for the addition of a conventional light source in the device.

Figure 4:
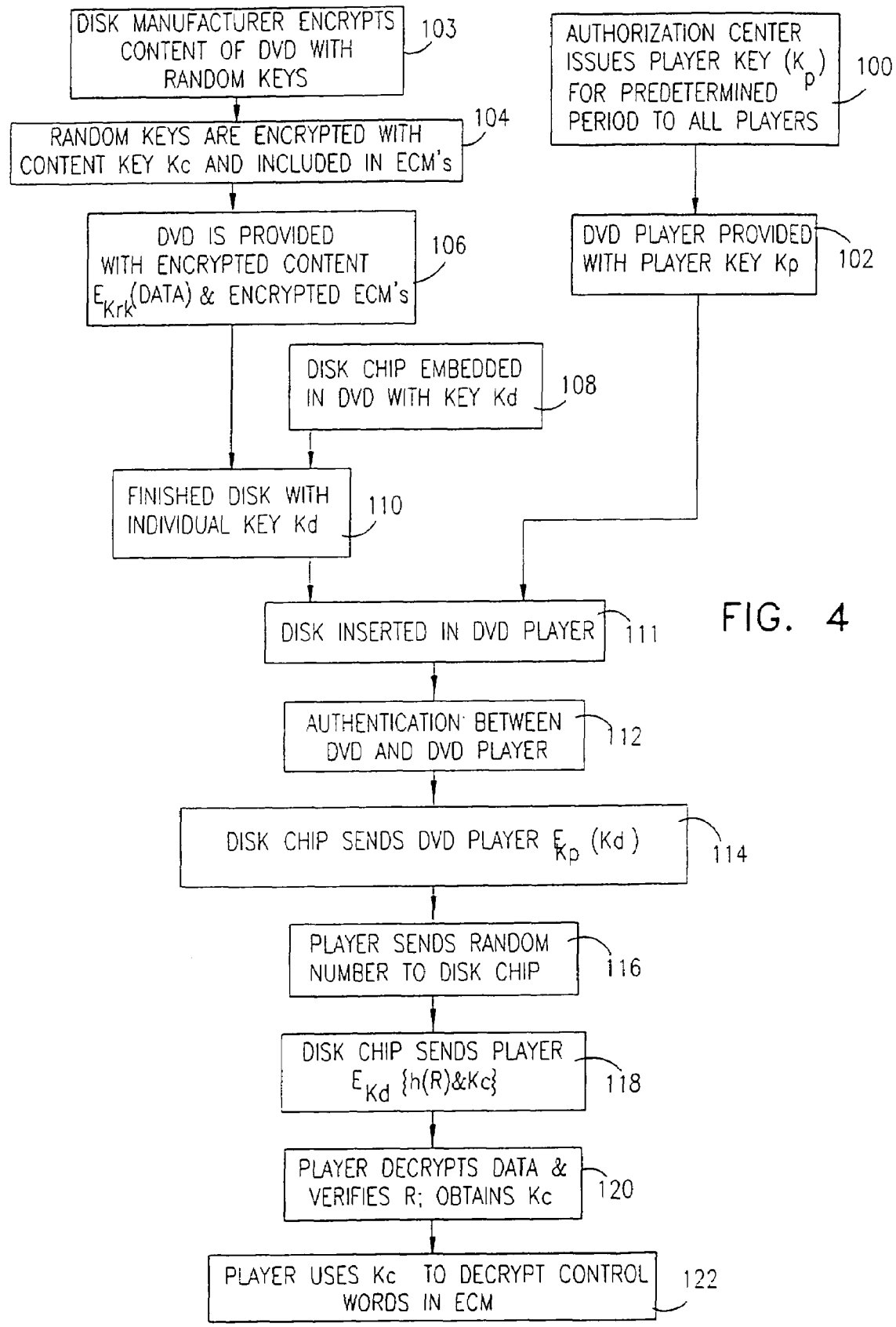
FIG. 4 is a simplified flow chart of operation of the secure communications system of FIG. 1, in accordance with a preferred embodiment of the present invention.
Figure 5:
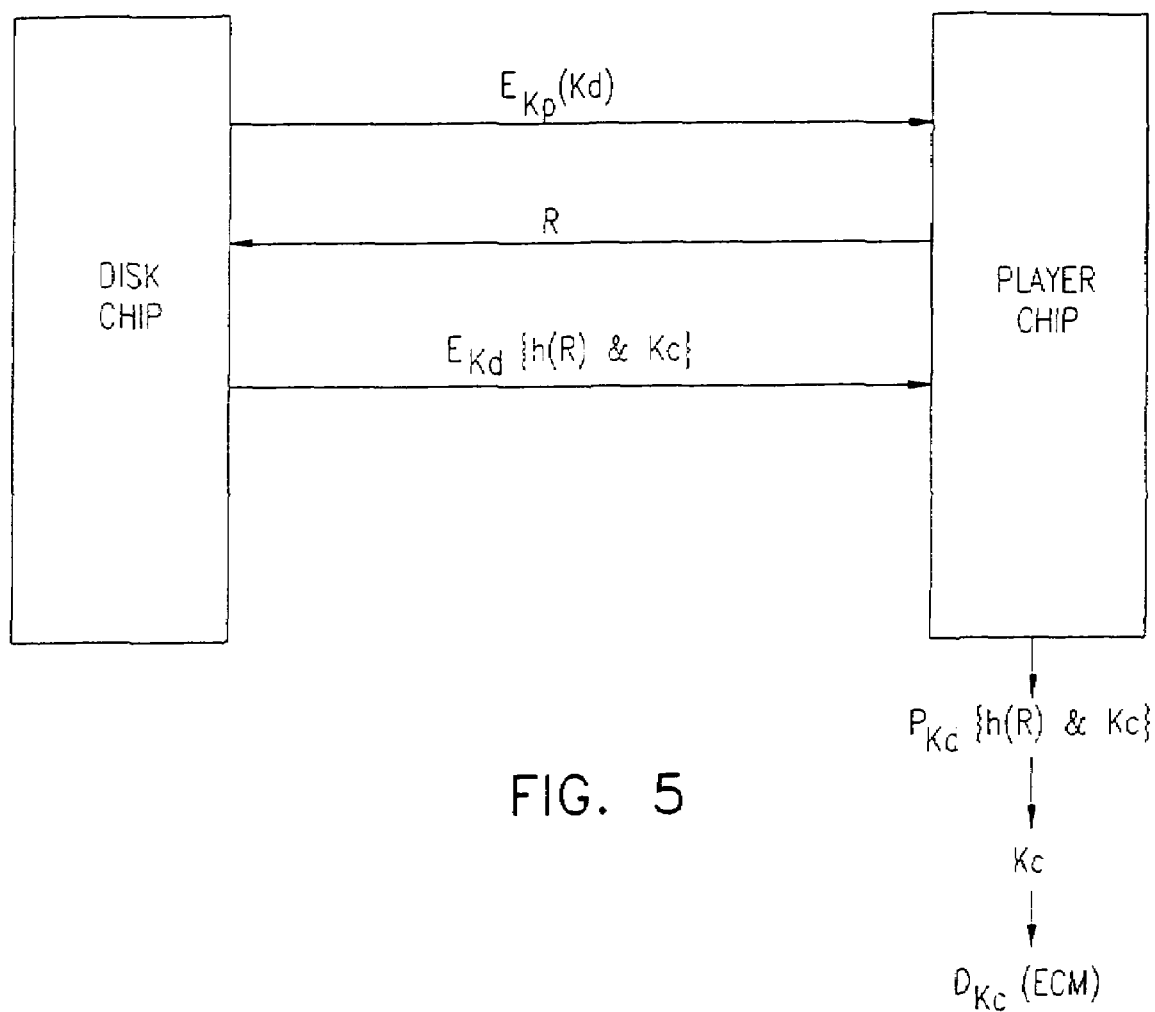
FIG. 5 is a simplified block diagram of content reading transactions between the DVD and the DVD player of FIG. 1, in accordance with a preferred embodiment of the present invention.

Reference is now made to FIG. 4 which is a simplified flow chart of operation of the secure communications system of FIG. 1, in accordance with a preferred embodiment of the present invention. The description which follows also refers to FIG. 5 which is a simplified block diagram of content reading transactions between DVD 12 and DVD player 14, in accordance with a preferred embodiment of the present invention.

An authorization center issues a player key (Kp), common to all DVD players 14 during a predetermined period (step 100). Each player 14 is provided with key Kp (step 102), this key being valid until chip 18 is replaced. Player key Kp should be attributed and validated by the authorization center in an hierarchical manner. Kp is known to all DVD players 14 and disk manufacturers at a given time. When player chip 18 is replaced, the new version should keep in memory previous versions Kp to allow old content playing (i.e., backward compatibility).

The disk manufacturer encrypts the different sections of content of DVD 12 with a set of random keys Krk, using an appropriate algorithm, such as DES or DVB common scrambling, that are of common use in commercial TV broadcast (step 103). These keys are encrypted with a content key (Kc) with a known algorithm, such as DES or RC-5, and included in the ECM's (step 104). Disk 12 is thus provided with an encrypted content $E_{Krk}$(DATA), and ECM's that include encrypted keys $E_{Kc}$(Krk) (step 106). Disk chip 16 is embedded in DVD 12, as described hereinabove (step 108). A disk key Kd, specific to each disk, is programmed in disk chip 16. It is noted that since one can wirelessly communicate with disk chip 16, one can program disk chip 16 even after packaging in a commercial shipment package, for example, if desired.

Each finished DVD 12 preferably has its own individual key Kd, even though the plurality of DVD's may have common content, encrypted similarly with Krk and Kc (step 110).

It should be noted that separate, independent protection may be provided for each data stream, audio and visual, i.e., different keys, as well as for individual sections of the media recording disk.

DVD 12 is now ready for insertion and playing in DVD player 14 (step 111). First, in step 112, disk chip 16 performs an authentication process with player chip 18, making sure that the creation on DVD 12 is about to be played in a legitimate player. After this authentication is successful, chip 16 checks disk-specific authorizations, such as if the viewer is allowed to see portions of DVD 12, which portions, how many times, for how long, etc. DVD 12 can refuse to play in a player that is not trustworthy.

To provide a greater level of trust, mutual zero-knowledge interaction authentication sessions between disk and player may be held, such as the so-called Fiat-Shamir authentication methods taught in U.S. Pat. No. 4,748,668 to Shamir and Fiat, the disclosure of which is incorporated herein by reference.

In step 114, disk chip 16, after assuring that DVD player 14 is authentic, sends Player chip 18 its own key Kd, encrypted with the known player key Kp, in the form of $E_{Kp}$(Kd). The encryption algorithm may be DES or RC-5, for example. This data is preferably not computed by disk chip 16 in real time, but rather put into the chip during initialization.

Player chip 18 may verify the legitimacy of the disk key Kd in any convenient manner. For example, an accurate measurement of a dimension (e.g., diameter, thickness or eccentricity) of the disk, such as to a level of accuracy of 0.001 mm, can be made of each disk by the disk manufacturer. The dimension may be used to generate a random number that will be digitally signed and stored in disk chip 16. As another example, if multi-layer disks are used, an angle of registration between the layers may randomly vary between disks with similar content, this angle being known by the disk manufacturer for each disk during routine quality control procedures. The angle between the layers may be used to generate a random number that will be digitally signed and stored in disk chip 16. In any case, player chip 18 is then able to verify that the disk manufacturer knows how to sign the disk, and therefore is authorized to sell disks. The above methods of legitimacy verification can be easily implemented by using the existing mechanisms in the laser head.

In step 116, player chip 18 sends a random number R to disk chip 16. The random number R may be generated in any convenient manner, such as a noisy diode serving as a random source of bits with appropriate discrimination to obtain the random binary output, as mentioned in U.S. Pat. No. 4,748,668.

In step 118, disk chip 16 sends player chip 18 an encrypted concatenation of a hash function of R and the content key Kc, encrypted with Kd, in the form of $E_{Kd}${h(R) & Kc}. This way, one can assume that each time a disk is played, the Kc key is transmitted to player chip 18 in a different encryption, because random number R is different. Therefore, listening to contactless communication between DVD chip 16 and player chip 18 cannot circumvent the security system of the present invention, thereby solving the security problem that the prior art does not solve.

In step 120, player chip 18 decrypts the data, i.e., performs $D_{Kd}${h(R) & Kc}. In parallel, player chip 18 computes h(R), based on the R previously generated in step 116. If both values of h(R) are equal, this means that the disk chip programmer knows Kp, because it had previously sent $E_{Kp}$(Kd) in step 114, and the Kd key has been proven as adequate to decrypt h(R). This proves that the disk was manufactured by an authorized manufacturer. Player chip 18 then obtains Kc.

In step 122, player chip 18 uses Kc to decrypt control words that are located within ECM's in DVD 12, i.e., performs $D_{Kc}(ECM)$, thereby permitting a user to commence enjoyment of the disk content.

As a further example of the scope of the present invention, instead of embedding the disk security chip 16 in DVD 12, the security chip may be embedded on a media recording disk different and separate from DVD 12, such as a stiffy diskette, wherein the security chip 16 then wirelessly communicates with the player security chip as described hereinabove. In this case, the encryption information is on the diskette, not on the DVD which contains the content to be played in player 14.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A method for protecting access to content recorded on a media recording disk (DVD), comprising:
    providing a disk security chip on the DVD, said disk security chip managing access to the content of the DVD;
    providing a corresponding player security chip in a DVD player which is operative to play the DVD, said player security chip managing use of a data stream received from the DVD, said disk security chip being in wireless communication with said player security chip; and
    providing said disk security chip with a disk key not known to a disk manufacturer,
    wherein said disk security chip, after assuring that said DVD player is authentic, sends said DVD player said disk key.

2. The method according to claim 1 and comprising encrypting contents of said DVD with a content key.

3. The method according to claim 1 and comprising performing an authentication process between said disk security chip and said player security chip.

4. The method according to claim 3 and wherein said authentication process comprises a mutual zero-knowledge interaction authentication process.

5. The method according to claim 1 and wherein said disk security chip, after assuring that said DVD player is authentic, sends said DVD player said disk key encrypted with said player key.

6. The method according to claim 1 and wherein said player security chip verifies legitimacy of said disk key as a function of a geometric property of said DVD.

7. The method according to claim 6 and wherein said DVD is a multi-layer DVD and said geometric property is an angle between layers of said DVD.

8. A method for protecting access to content recorded on a media recording disk (DVD), comprising:
    providing a disk security chip on the DVD, said disk security chip managing access to the content of the DVD; and
    providing a corresponding player security chip in a DVD player which is operative to play the DVD, said player security chip managing use of a data stream received from the DVD, said disk security chip being in wireless communication with said player security chip,
    wherein said disk security chip, after assuring that said DVD player is authentic, sends said DVD player a disk key.

9. The method according to claim 8 and comprising encrypting contents of said DVD with a content key.

10. The method according to claim 8 and comprising performing an authentication process between said disk security chip and said player security chip.

11. The method according to claim 10 and wherein said authentication process comprises a mutual zero-knowledge interaction authentication process.

12. The method according to claim 8 and wherein said disk security chip, after assuring that said DVD player is authentic, sends said DVD player said disk key encrypted with said player key.

13. The method according to claim 8 and wherein said player security chip verifies legitimacy of said disk key as a function of a geometric property of said DVD.

14. The method according to claim 13 and wherein said DVD is a multi-layer DVD and said geometric property is an angle between layers of said DVD.

* * * * *